Patented Jan. 9, 1951

2,537,518

UNITED STATES PATENT OFFICE 2,537,518

DIETHYLENE GLYCOL BIS(S-PHENYL THIOCARBONATE)

William R. Dial, Akron, Ohio, assignor to Pittsburgh Plate Glass Company, Allegheny County, Pa., a corporation of Pennsylvania No Drawing. Application May 2, 1946, Serial No. 666,813

1 Claim. (Cl. 260—455)

The present invention relates to the production of new ester compounds and more particularly to the preparation of a new class of esters of thiophenol and the homologs thereof.

Other objects and advantages of the invention will be readily apparent from the following detailed description of certain preferred embodiments thereof.

The invention is directed particularly to compound esters of glycols and polyglycols, including ethylene glycol, di- and tri-methylene glycol, propylene glycol, butylene glycol, and di-, tri-, tetra-, penta-, or hexaethylene glycols, the di-, tri-, or tetrapropylene glycols, dibutylene glycol, tributylene glycol, the polyglycols of trimethylene glycol, pentamethylene glycol, etc., all of which are advantageously encompassed within the term "glycol," and thiophenol together with its homologs, including thiocresol, classified for the immediate application under the expression "phenolic substance."

The contemplated esters will have the following general structural formula:

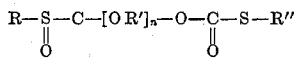

wherein R and R″ are each radicals selected from the group consisting of phenyl, methylphenyl, dimethylphenyl and trimethylphenyl radicals and R′ is an alkylene radical containing from 2 to 4 carbon atoms, and $n$ is a small whole number.

The esters herein contemplated may be prepared by reaction of the dichloroformate of a glycol with the desired phenolic substance. In general substantially theoretical amounts of reactants are used in the preparation of the various esters although an excess of the phenolic substance may be employed if desired. The reaction between the chloroformate and phenolic substance is promoted by the presence of a basic reagent. For this purpose, it is preferred to use sodium hydroxide, although other oxides, hydroxides and carbonates of the alkali or alkaline earth metals, or the organic bases such as pyridine, quinoline, dimethylaniline, etc. may be employed.

The following examples are illustrative of the preparation of representative esters falling within the scope of my invention.

Example I

A glass reaction vessel fitted with a nickel stirrer, a thermometer and a spray inlet tube and containing two mols (467 grams) of diethylene glycol bis(chloroformate), is immersed in a cooling bath of ice and salt until the chloroformate temperature is reduced to 5° C. Thereafter 4.8 mols (451 grams) of phenol are added to the reaction vessel with continued cooling in order that the temperature of the mixture so formed is maintained at about 5° C. Stirring of the mixture is initiated and a 50% solution of sodium hydroxide is introduced into the reaction vessel through the spray inlet tube. A total of 4.8 mols (384 grams of the 50% solution) of sodium hydroxide is added at a rate such that the reaction mixture is maintained below a maximum temperature of 5° C.

When addition of the sodium hydroxide is complete, the mixture is stirred for an additional period of time to insure substantial completion of the reaction. Ordinarily five to ten minutes of additional stirring is sufficient. The reaction mixture is permitted to reach room temperature and is combined with about 600 cc. of water causing separation into two phases. The non-aqueous phase, containing the reaction product is extremely viscous and to facilitate further handling it is diluted with 600 cc. of ethylene dichloride. The mixture of solvent and reaction product is washed with distilled water until the wash water is neutral to litmus. The washed solution is decolorized with activated charcoal and the solvent is removed by distillation at atmospheric pressure. The product is identified as diethylene glycol bis(phenyl carbonate). The reaction yield is approximately 93.5% based on the diethylene glycol bis(chloroformate).

Diethylene glycol bis(phenyl carbonate) is a viscous liquid, easily supercooled. It crystallizes slowly to a white solid having a melting point of 39-40° C. It possesses a slight yellow color, when in liquid form, and has a mild phenolic odor. The ester has a refractive index, $n_D^{20°}$, of 1.5254 and a specific gravity 20° C./4° C. of 1.238.

Example II

Again employing the technique of Example I, but using thiophenol in lieu of phenol there is prapared diethylene gylcol bis(S-phenyl thiocarbonate) in a yield of 92%. This ester has a refractive index, $n_D^{20°}$, of 1.5780, and a specific gravity, 20° C./4° C. of 1.248. The viscosity at 20° C. is 354 centipoises.

The esters included within the scope of this invention are generally high-boiling, viscous liquids although in some cases they may be solids of low-melting points. The liquids are particularly interesting since they have high boiling points and very high viscosities. The new esters are compatible with many organic solvents, such as acetone, ethyl alcohol, xylene, carbon disulfide, chloroform, ethyl acetate, etc. They are, in general, substantially insoluble in water.

The compounds herein described are capable of wide use as solvents and plasticizers. They are found to be particularly effective as plasticizers for synthetic resins and plastics, such as the cellulose esters and ethers, including cellulose acetate, nitrate and acetobutyrate, methyl and ethyl cellulose, the vinyl resins including vinyl acetate, vinyl chloride and styrene, the acrylates, and the butadiene polymers including copolymers of butadiene with styrene, acrylonitrile, etc. Synthetic rubber compositions comprising the butadiene polymers modified with esters of this invention may be vulcanized at an elevated temperature without loss of plasticizer or the formation of a bubbled or porous product due to vaporization of the modifying agent in situ at the vulcanizing temperatures. Although many of these new compounds are viscous at low temperatures, the viscosity decreases rapidly with an increase in temperature and their admixture with resin or plastic can be accomplished readily.

What I claim is:

Diethylene glycol bis(S-phenyl thiocarbonate).

WILLIAM R. DIAL.

REFERENCES CITED

The following references are of record in the file of this patent:

UNITED STATES PATENTS

| Number    | Name         | Date          |
|-----------|--------------|---------------|
| 2,161,584 | Moran et al. | June 6, 1939  |
| 2,379,250 | Muskat et al.| June 26, 1945 |
| 2,381,511 | Muskat et al.| Aug. 7, 1945  |